US010710250B2

(12) United States Patent
Ichibangase et al.

(10) Patent No.: US 10,710,250 B2
(45) Date of Patent: Jul. 14, 2020

(54) ROBOT

(71) Applicant: KABUSHIKI KAISHA YASKAWA DENKI, Kitakyushu-shi (JP)

(72) Inventors: Atsushi Ichibangase, Kitakyushu (JP); Tsuyoshi Ito, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 161 days.

(21) Appl. No.: 15/955,705

(22) Filed: Apr. 18, 2018

(65) Prior Publication Data
US 2018/0311834 A1 Nov. 1, 2018

(30) Foreign Application Priority Data

Apr. 26, 2017 (JP) ................. 2017-087312

(51) Int. Cl.
B25J 18/04 (2006.01)
B25J 9/06 (2006.01)
B25J 19/00 (2006.01)
B23K 9/133 (2006.01)
B25J 9/00 (2006.01)
B25J 17/02 (2006.01)

(52) U.S. Cl.
CPC ............... *B25J 18/04* (2013.01); *B23K 9/133* (2013.01); *B25J 9/0009* (2013.01); *B25J 9/0027* (2013.01); *B25J 9/06* (2013.01); *B25J 17/0283* (2013.01); *B25J 19/0029* (2013.01)

(58) Field of Classification Search
CPC ... B25J 17/025; B25J 19/0029; B25J 17/0241
See application file for complete search history.

(56) References Cited

U.S. PATENT DOCUMENTS 4,547,120 A * 10/1985 Turner, Jr. ........... B25J 19/0029
414/735
4,732,526 A * 3/1988 Nakashima .............. B25J 9/046
310/88

(Continued)

FOREIGN PATENT DOCUMENTS

DE 4244379 A1 * 6/1994 ................ B25J 9/06
WO WO-2004096503 A1 * 11/2004 .............. B25J 9/102

(Continued)

Primary Examiner — Terence Boes
(74) Attorney, Agent, or Firm — Mori & Ward, LLP

(57) ABSTRACT

A robot includes a first arm rotatable around a first axis and a second arm having an extending direction. The first arm includes a first base and a first extending portion. The first base includes a first through hole passing through the first arm along the first axis. The first extending portion extends from the first base along the first axis. The second arm includes a second base and a second extending portion. The second base includes a connection portion connected to the first extending portion such that the second arm is rotatable around a second axis that is substantially orthogonal to the first axis. The second base includes a second through hole passing through the second arm along the extending direction. The second extending portion is provided opposite to the connection portion in the extending direction and extends from the second base along the extending direction.

17 Claims, 7 Drawing Sheets

(56) References Cited

U.S. PATENT DOCUMENTS

| | | | |
|---|---|---|---|
| 4,922,755 A * | 5/1990 | Oshiro | B25J 9/102 |
| | | | 74/490.03 |
| 7,646,161 B2 | 1/2010 | Albu-Schaffer et al. | |
| 7,971,504 B2 * | 7/2011 | Haniya | B25J 9/0087 |
| | | | 74/490.03 |
| 9,056,397 B2 * | 6/2015 | Okada | B25J 9/102 |
| 10,414,044 B2 * | 9/2019 | Motomura | B25J 9/102 |
| 2015/0283709 A1 * | 10/2015 | Dalakian | B25J 17/025 |
| | | | 74/490.04 |
| 2016/0114491 A1 * | 4/2016 | Lee | B25J 19/0029 |
| | | | 74/490.06 |
| 2018/0154528 A1 * | 6/2018 | Saitou | B25J 19/0075 |

FOREIGN PATENT DOCUMENTS

| | | | | |
|---|---|---|---|---|
| WO | WO-2004110704 A1 * | 12/2004 | | B25J 19/0029 |
| WO | WO-2010127701 A1 * | 11/2010 | | B25J 9/102 |

* cited by examiner

ROBOT

CROSS-REFERENCE TO RELATED APPLICATION

This application claims priority from Japanese Patent Application No. 2017-087312 filed with the Japan Patent Office on Apr. 26, 2017, the entire content of which is hereby incorporated by reference.

BACKGROUND

1. Technical Field

An embodiment of the disclosure relates to a robot.

2. Description of the Related Art

Typically, a robot which operates by driving a plurality of joints is known. An end effector provided for uses such as welding or holding is attached to the tip of such a robot. This end effector is utilized for performing various operations such as processing and transportation of a workpiece.

Also, a robot which has seven axes including six axes and a redundant axis to widen the movable range of an end effector and reduce a change in the posture of the robot has been proposed (for example, see U.S. Pat. No. 7,646,161).

SUMMARY

A robot according to an aspect of embodiments includes a first arm and a second arm. The first arm is rotatable around a first axis. The first arm includes a first base and a first extending portion. The first base includes a first through hole passing through the first arm along the first axis. The first extending portion extends from the first base along the first axis. The second arm has an extending direction. The second arm includes a second base and a second extending portion. The second base includes a connection portion connected to the first extending portion such that the second arm is rotatable around a second axis that is substantially orthogonal to the first axis. The second base includes a second through hole passing through the second arm along the extending direction. The second extending portion is provided opposite to the connection portion in the extending direction and extends from the second base along the extending direction.

DESCRIPTION OF THE EMBODIMENTS

Figure 1:
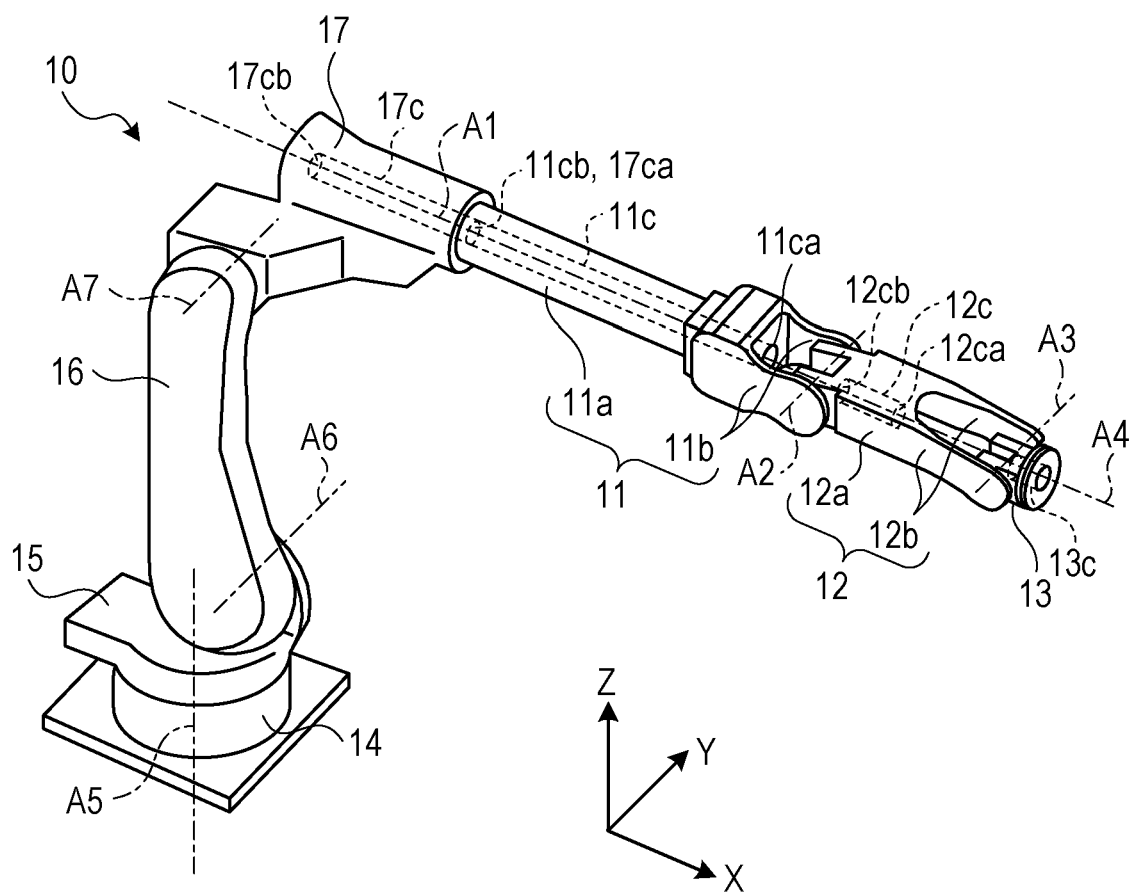
FIG. 1 is a perspective view of a robot according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An embodiment of the robot disclosed in this application will be described in detail with reference to the accompanying drawings. The following embodiment does not limit the technique of this disclosure. In the following description, a case where the robot performs the work of applying a so-called sealing material will be mainly described. However, the contents of the work performed by the robot are not limited to applying a sealing material, and may be picking, painting, welding, and the like of a workpiece.

In the following embodiment, expressions such as "orthogonal", "perpendicular", "parallel", "symmetric", "coincide", and "overlap" may be used. These expressions do not indicate being strictly "orthogonal", "perpendicular", "parallel", "symmetric", "coincide" or "overlap." That is, the above-described expressions allow deviations in manufacturing accuracy, installment accuracy, and the like.

Figure 2:
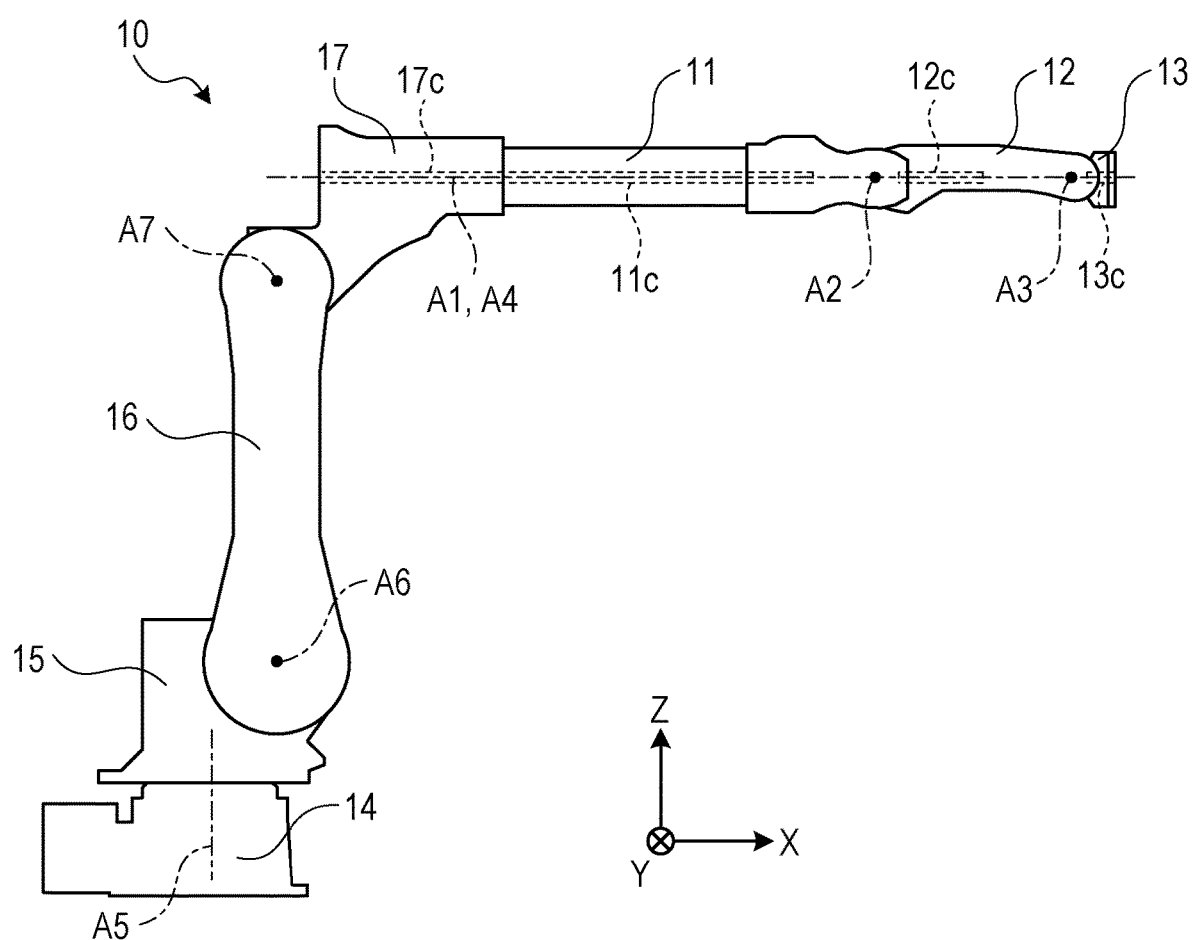
FIG. 2 is a side view of the robot.

Firstly, a robot 10 according to an embodiment will be described with reference to FIG. 1 and FIG. 2. FIG. 1 is a perspective view of the robot 10. FIG. 2 is a side view of the robot 10. In FIG. 1 and FIG. 2, a three-dimensional orthogonal coordinate system including the Z-axis whose vertical upward direction is the positive direction is illustrated for facilitating the description. This orthogonal coordinate system may also be illustrated in another drawing used in the following description.

As illustrated in FIG. 1, the robot 10 is a so-called perpendicular articulated robot having seven axes of a first axis A1 to a seventh axis A7. The robot 10 includes, from the base end side to the tip side, a pedestal 14, a base portion 15, a lower arm 16, an upper arm 17, a first arm 11, a second arm 12, and a wrist portion 13.

Here, the tip sides of the first arm 11 and the second arm 12 have a so-called bifurcated shape. Therefore, in the posture illustrated in FIG. 1, an "opened space" opened in the vertical direction (the direction along the Z axis) is secured on the tip side of each of the first arm 11 and the second arm 12.

Also, the first arm 11 includes a first through hole 11c running along the first axis A1. It is noted that the opening on the base end side (the negative direction side of the X-axis) of the first through hole 11c is an opening 11cb. The opening on the tip side (the positive direction side of the X-axis) of the first through hole 11c is an opening 11ca. Here, the central axis of the first through hole 11c preferably coincides with the first axis A1.

When the central axis of the first through hole 11c coincides with the first axis A1, an external cable inserted into the first through hole 11c is unlikely to be affected by the rotation of the first arm 11. Here, examples of the external cable to be used include a cable for supplying gas, liquid, or power, and a cable formed by coating these cables in a bundle.

The second arm 12 includes a second through hole 12c as illustrated in FIG. 1. The second through hole 12c runs along the first axis A1 when the posture of the robot 10 is such that the first axis A1 coincides with the fourth axis A4. It is noted that the opening on the base end side (the negative direction side of the X-axis) of the second through hole 12c is an opening 12cb. The opening on the tip side (the positive direction side of the X-axis) of the second through hole 12c is an opening 12ca.

Here, when the posture of the robot 10 is such that the first axis A1 coincides with the fourth axis A4, the central axis of the second through hole 12c preferably coincides with the first axis A1. If the central axis of the second through hole 12c coincides with the first axis A1 when the posture of the robot 10 is as illustrated in FIG. 1, an external cable inserted into the first through hole 11c is easily inserted into the second through hole 12c.

Furthermore, the upper arm 17 includes a through hole 17c running along the first axis A1. It is noted that the opening on the base end side (the negative direction side of the X-axis) of the through hole 17c is an opening 17cb. The opening on the tip side (the positive direction side of the X-axis) of the through hole 17c is an opening 17ca. Also, the wrist portion 13 includes a through hole 13c. The through hole 13c (the central axis of the through hole 13c) runs along the first axis A1 when the posture of the robot 10 is such that the first axis A1 coincides with the fourth axis A4. Furthermore, as described above, the first arm 11 includes the first through hole 11c and the opened space, and the second arm 12 includes the second through hole 12c and the opened space.

In brief, the through hole 17c of the upper arm 17 communicates with the first through hole 11c of the first arm 11. Furthermore, the first through hole 11c communicates with the opened space of the first arm 11. Also, the opened space of the first arm 11 communicates with the second through hole 12c of the second arm 12. Furthermore, the second through hole 12c communicates with the opened space of the second arm 12. Then, the opened space of the second arm 12 communicates with the through hole 13c of the wrist portion 13.

That is, when the posture of the robot 10 is as illustrated in FIG. 1 (such that the first axis A1 coincides with the fourth axis A4), the through hole 17c of the upper arm 17 and the through hole 13c of the wrist portion 13 linearly communicate with each other along the first axis A1. Therefore, in this case, an external cable for an end effector to be attached to the wrist portion 13 can be easily inserted into the upper arm 17 through the wrist portion 13. The diameters of the through hole 17c, the first through hole 11c, the second through hole 12c, and the through hole 13c are preferably comparable to each other.

Furthermore, as described above, the "opened space" is secured in each of the first arm 11 and the second arm 12. Therefore, an external apparatus such as a meter can be housed in these opened spaces. This can suppress protrusion of an external apparatus from the surface of the robot 10. As a result, the movable range of the robot 10 can be widened. Also, these opened spaces can be used for facilitating maintenance of an external apparatus and an external cable.

Also, when an external cable for an end effector is inserted into the robot 10, the above-described opened spaces serve as an escape space for the external cable whose posture is changed in response to a change in the posture of the robot 10. Therefore, sudden bending of the external cable can be avoided.

Hereinafter, the configuration of the robot 10 will be described in further detail. The pedestal 14 is fixed to an installation surface such as a floor. The base portion 15 is supported by the pedestal 14, and rotates around the fifth axis A5 which is perpendicular to the installation surface. The lower arm 16 is supported by the base portion 15, and turns around the sixth axis A6 which is perpendicular to the fifth axis A5. The upper arm 17 is supported by the lower arm 16, and turns around the seventh axis A7 which is parallel to the sixth axis A6.

The base end side of the first arm 11 is supported by the upper arm 17. The first arm 11 rotates around the first axis A1 which is perpendicular to the seventh axis A7. Also, the first arm 11 includes a first base end portion 11a and a first stretch portion 11b. The first base end portion 11a includes the first through hole 11c running along the first axis A1. The first stretch portion 11b stretches along the first axis A1 toward the tip side from a position where the opening 11ca of the first through hole 11c is avoided in the first base end portion 11a.

Here, in the example illustrated in FIG. 1, two first stretch portions 11b are disposed in such a manner as to sandwich the opening 11ca, and support the second arm 12. Alternatively, one of the two first stretch portions 11b may be omitted. In this case, the first arm 11 has a so-called cantilevered shape which includes one first stretch portion 11b.

The base end side of the second arm 12 is supported by the tip side of the first arm 11. The second arm 12 turns around the second axis A2 which is orthogonal to the first axis A1. Also, the second arm 12 includes a second base end portion 12a and a second stretch portion 12b. The second base end portion 12a includes the second through hole 12c. When the posture of the robot 10 is such that the first axis A1 coincides with the fourth axis A4, the second through hole 12c runs along the first axis A1, and the second stretch portion 12b stretches along the first axis A1 toward the tip side from a position where the opening 12ca of the second through hole 12c is avoided in the second base end portion 12a.

Here, in the example illustrated in FIG. 1, two second stretch portions 12b are disposed in such a manner as to sandwich the opening 12ca, and support the wrist portion 13. Alternatively, one of the two second stretch portions 12b may be omitted. In this case, the second arm 12 has a so-called cantilevered shape which includes one second stretch portion 12b.

The base end side of the wrist portion 13 is supported by the tip side of the second arm 12. The wrist portion 13 turns around the third axis A3 which is parallel to the second axis A2. Furthermore, the tip side of the wrist portion 13 rotates around the fourth axis A4 which is orthogonal to the third axis A3. Also, the wrist portion 13 includes the through hole 13c. The through hole 13c runs along the first axis A1 when the posture of the robot 10 is such that the first axis A1 coincides with the fourth axis A4. It is noted that various end effectors corresponding to the contents of work are detachably fixed to the tip side of the wrist portion 13.

Next, the side surface shape of the robot 10 will be described with reference to FIG. 2. It is noted that the posture of the robot 10 illustrated in FIG. 2 is the same as the posture of the robot 10 illustrated in FIG. 1. Also, a description of the matters having been described in FIG. 1 will be omitted.

As illustrated in FIG. 2, the sixth axis A6 is offset to the fifth axis A5 in the horizontal direction (X direction). By offsetting the sixth axis A6 in this manner, the tip of the robot 10 can reach a position further from the fifth axis A5.

Also, when the posture of the robot 10 is as illustrated in FIG. 2, the first axis A1 is offset upward to the seventh axis A7. By offsetting the first axis A1 in this manner, even when the upper arm 17 is turned clockwise so that the posture of the robot 10 becomes such that the lower arm 16 and the upper arm 17 coincide with each other along the Y direction (such that the robot 10 is folded), the interference between the lower arm 16 and the upper arm 17 can be suppressed.

Also, as illustrated in FIG. 2, when the posture of the robot 10 is such that the first axis A1 and the fourth axis A4 coincide with each other, the through hole 17c of the upper arm 17, the first through hole 11c of the first arm 11, the second through hole 12c of the second arm 12, and the through hole 13c of the wrist portion 13 are linearly arranged along the first axis A1.

Figure 3A:
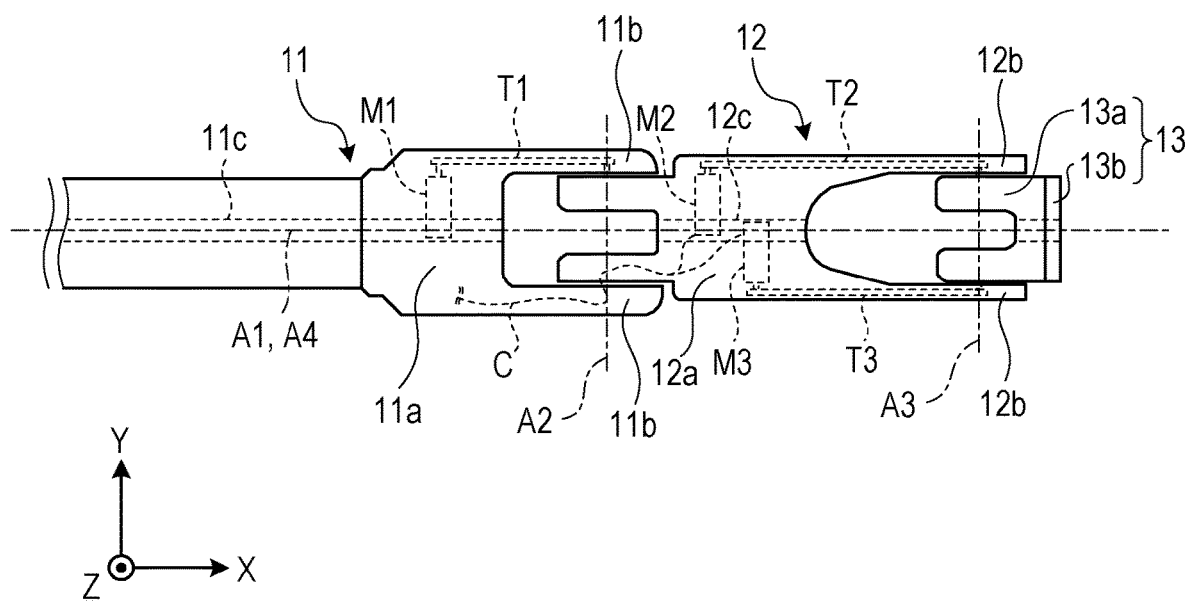
FIG. 3A is a top view illustrating a tip side from a first arm of the robot.
Figure 3B:
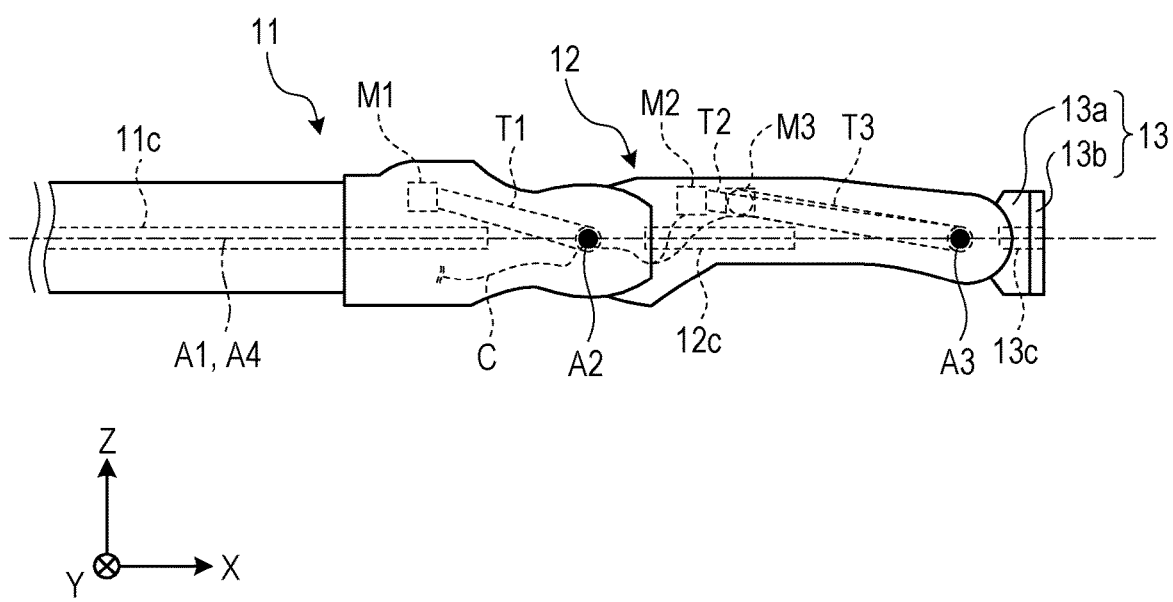
FIG. 3B is a side view illustrating a tip side from a first arm of the robot.

Next, the configurations of the first arm 11, the second arm 12, and the wrist portion 13 will be described in further detail with reference to FIG. 3A and FIG. 3B. FIG. 3A is a top view illustrating the tip side from the first arm 11 of the robot 10. FIG. 3B is a side view illustrating the tip side from the first arm 11 of the robot 10. In FIG. 3A and FIG. 3B, the base end side in the first arm 11 is omitted.

As illustrated in FIG. 3A, the first base end portion 11a of the first arm 11 houses a power source M1. The power source M1 generates power for turning the second arm 12 around the second axis A2. An example of the power source M1 includes an actuator such as a motor. The power source M1 corresponds to an example of the first power source provided for the second axis A2

Also, a transfer portion T1 is disposed inside one of the first stretch portions 11b. The transfer portion T1 transfers power from the power source M1 to the second arm 12. Here, examples of the transfer portion T1 include a pulley and a belt. However, other mechanisms such as a shaft and a gear may be used as the transfer portion T1.

Also, a space for housing part of an internal cable C routed from the first arm 11 to the second arm 12 is disposed inside the other of the first stretch portions 11b. The internal cable C is routed, for example, between the first arm 11 and the second arm 12 via a hollow shaft or the like disposed along the second axis A2.

In this manner, in the example illustrated in FIG. 3A and FIG. 3B, the transfer portion T1 is disposed in one of the first stretch portions 11b, and the housing space of the internal cable C is disposed in the other of the first stretch portions 11b. Accordingly, the spaces inside the first stretch portions 11b can be efficiently utilized. Furthermore, since the transfer portion T1 and the housing space of the internal cable C are disposed to the separate first stretch portions 11b, the first stretch portions 11b can be thinned.

Here, as illustrated in FIG. 3B, the power source M1 is housed in the position where the first through hole 11c is avoided. In the example illustrated in FIG. 3B, the power source M1 is housed in the position where the first through hole 11c is avoided upward (in the positive direction of the Z-axis). Alternatively, the power source M1 may be housed in the position where the first through hole 11c is avoided downward (in the negative direction of the Z-axis).

It is noted that when the power source M1 is small in size, the power source M1 can be housed in the position where it overlaps with the first through hole 11c in the Z direction in FIG. 3B. In brief, in this case, the power source M1 may be housed in the position where the first through hole 11c is avoided in the left and right directions (the positive and negative directions of the Y-axis).

Also, as illustrated in FIG. 3A, the second base end portion 12a of the second arm 12 houses a power source M2 and a power source M3. The power source M2 generates power for turning the wrist portion 13 around the third axis A3. The power source M3 generates power for rotating the wrist portion 13 around the fourth axis A4. The power source M2 corresponds to an example of a second power source provided for the third axis A3. The power source M3 corresponds to an example of a third power source provided for the fourth axis A4.

By housing the power source M2 and the power source M3 in the second base end portion 12a in this manner, the second stretch portion 12b can be thinned. The housing position of the power source M2 and the housing position of the power source M3 may be switched for each other. An example of the power source M2 and the power source M3 includes an actuator such as a motor.

Also, a transfer portion T2 is disposed inside one of the second stretch portions 12b. The transfer portion T2 transfers the power from the power source M2 to the wrist portion 13. Also, a transfer portion T3 is disposed inside the other of the second stretch portions 12b. The transfer portion T3 transfers the power from the power source M3 to the wrist portion 13. Here, examples of the transfer portion T2 and the transfer portion T3 include a pulley and a belt. However, other mechanisms such as a shaft and a gear may be used as the transfer portion T2 and the transfer portion T3.

Here, as illustrated in FIG. 3B, the power source M2 and the power source M3 are housed in the position where the second through hole 12c is avoided. In the example illustrated in FIG. 3B, the power source M2 and the power source M3 are housed in the position where the second through hole 12c is avoided upward (in the positive direction of the Z-axis). Alternatively, the power source M2 and the power source M3 may be housed in the position where the second through hole 12c is avoided downward (in the negative direction of the Z-axis). Also, one of the power source M2 and the power source M3 may be housed above the second through hole 12c, and the other may be housed below the second through hole 12c.

It is noted that when the power source M2 and the power source M3 are small in size, the power source M2 and the power source M3 can be housed in the position where they overlap with the second through hole 12c in the Z direction in FIG. 3B. In brief, in this case, the power source M2 and the power source M3 may be housed in the position where the second through hole 12c is avoided in the left and right directions (the positive and negative directions of the Y-axis).

As illustrated in FIG. 3A, the wrist portion 13 includes on its base end side a turning portion 13a which turns around the third axis A3. The wrist portion 13 further includes on its tip side a rotating portion 13b which rotates around the fourth axis A4. It is noted that the through hole 13c extends through the turning portion 13a and the rotating portion 13b.

Also, as illustrated in FIG. 3A, the base end side of the second arm 12 (the second base end portion 12a) has a so-called bifurcated shape. When the base end side (the second base end portion 12a) of the second arm 12 has a bifurcated shape in this manner, two bifurcated shapes (the second base end portion 12a and the first stretch portion 11b) face each other. Therefore, the above-described "opened space" in the first arm 11 can be further widened.

The base end side (the turning portion 13a) of the wrist portion 13 also has a so-called bifurcated shape. When the base end side (the turning portion 13a) of the wrist portion 13 has a bifurcated shape in this manner, two bifurcated shapes (the turning portion 13a and the second stretch portion 12b) face each other. Therefore, the above-described "opened space" in the second arm 12 can be further widened.

It is noted that one or both of the bifurcated shapes on the base end sides of the second arm 12 and the wrist portion 13 may be omitted. Also, in the example illustrated in FIG. 3A and FIG. 3B, the internal cable C is connected to the power source M2 and the power source M3 which are housed in the second arm 12. Alternatively, the internal cable C may be connected to instruments such as a sensor arranged to the second arm 12 or the wrist portion 13.

Figure 4:
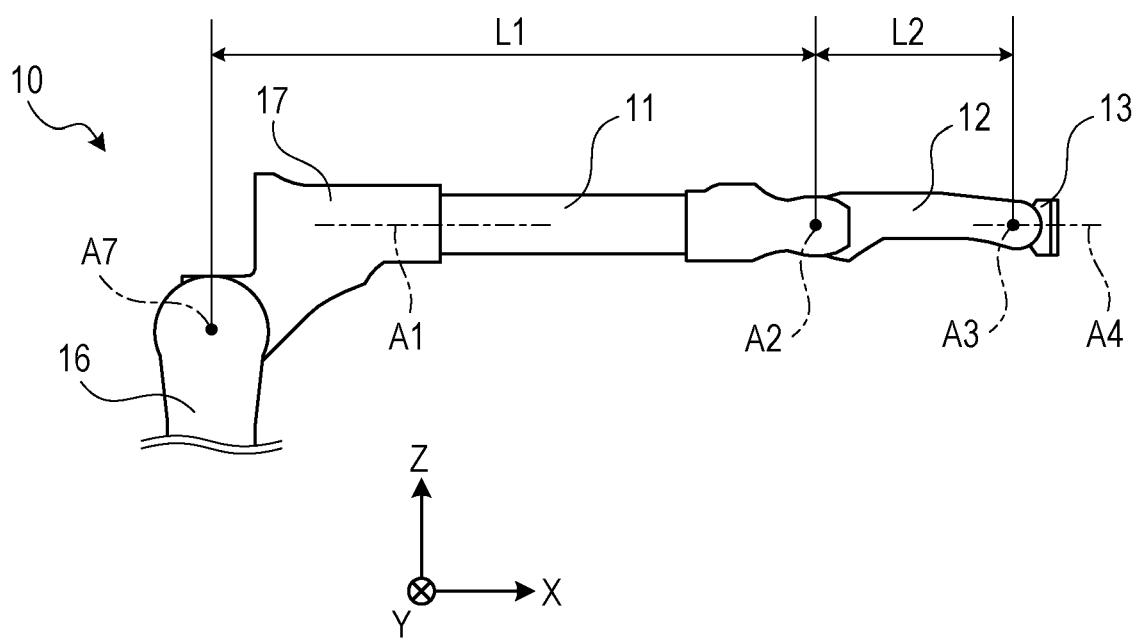
FIG. 4 is a side view of the robot for comparing arm lengths.

Next, the arm lengths in the robot 10 will be described with reference to FIG. 4. FIG. 4 is a side view of the robot 10 for comparing arm lengths. It is noted that the posture of the robot 10 illustrated in FIG. 4 is the same as the posture of the robot 10 illustrated in FIG. 2. In FIG. 4, the base end side in the lower arm 16 is omitted.

As illustrated in FIG. 4, the arm length when the upper arm 17 and the first arm 11 are regarded as one arm is defined to be an arm length L1. Also, the length of the second arm 12 is defined to be an arm length L2. Here, the arm length L1 is a distance (length) between the seventh axis A7 and the second axis A2 in the direction along the first axis A1. The arm length L2 is a distance (length) between the second axis A2 and the third axis A3.

Here, the arm length L2 is preferably shorter than the arm length L1. Accordingly, even when the first arm 11 and the second arm 12 are inserted into a narrow space, the posture of the second arm 12 is easily changed.

The ratio between the arm length L1 and the arm length L2 is preferably "2:1" to "4:1", further preferably approximately "3:1". This is because when the arm length L2 is excessively shorter than the arm length L1, the range which the wrist portion 13 reaches comes to be narrowed in a narrow space.

Figure 5A:
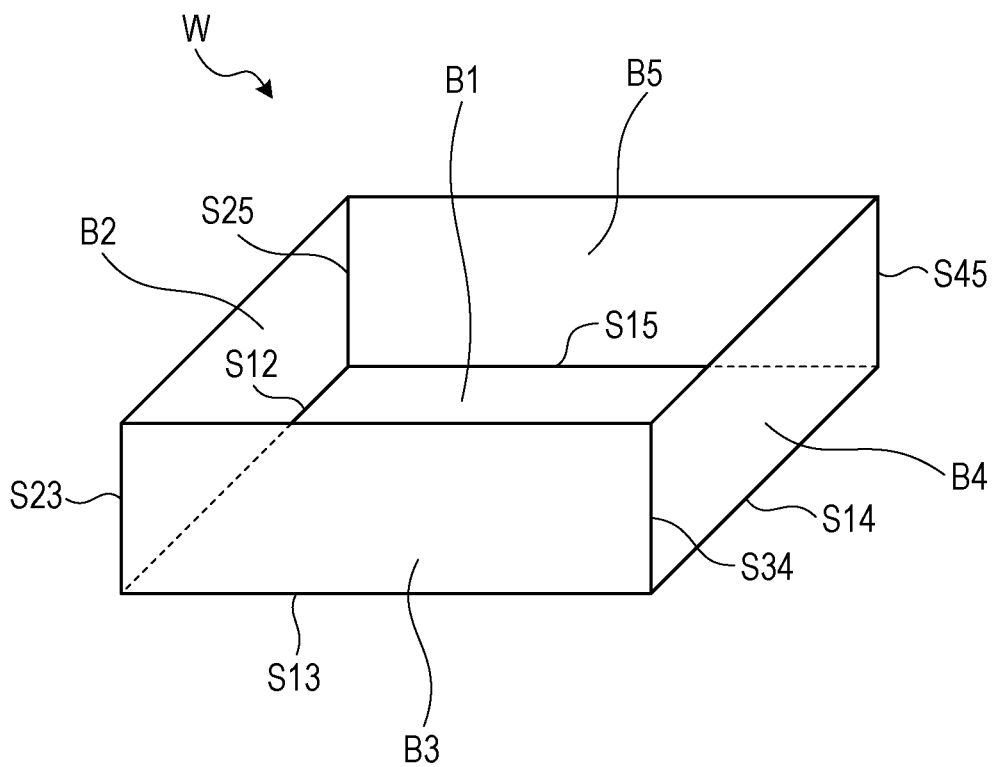
FIG. 5A is a schematic view illustrating an example of a workpiece.
Figure 5B:
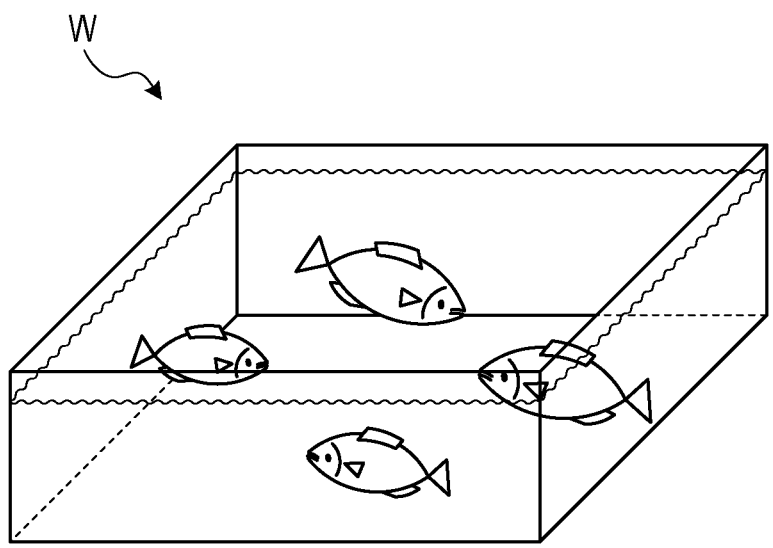
FIG. 5B is a schematic view illustrating a use example of a workpiece.

Next, a workpiece W for which the robot 10 works will be described with reference to FIG. 5A and FIG. 5B. FIG. 5A is a schematic view illustrating an example of the workpiece W. FIG. 5B is a schematic view illustrating a use example of the workpiece W. It is noted that in FIG. 5A and FIG. 5B, a perspective view of the workpiece W seen from diagonally above is illustrated as a schematic view.

As illustrated in FIG. 5A, the workpiece W is, for example, a box body with an open top obtained by combining five plate materials B1 to B5. Specifically, the workpiece W is manufactured by bonding the plate materials B1 to B5 with each other using an adhesive agent and the like such that the rectangular plate material B1 serves as the bottom surface of the workpiece W, and the four rectangular workpieces B2 to B5 rising from the sides of the plate material B1 serve as the side surfaces of the workpiece W.

Here, when pouring liquid such as freshwater and seawater into the workpiece W, it is estimated that the liquid leaks from the bonded portions of the plate materials B1 to B5 (portions where sides are in contact with each other). Therefore, the bonded portions of the plate materials B1 to B5 may be sealed from the inside of the workpiece W.

In the case illustrated in FIG. 5A, a sealing portion S12, a sealing portion S13, a sealing portion S14, and a sealing portion S15 corresponding to the four sides of the bottom surface, and a sealing portion S23, a sealing portion S34, a sealing portion S45, and a sealing portion S25 corresponding to the corners of the side surfaces become areas to be sealed.

As illustrated in FIG. 5B, the sealed workpiece W is used as, for example, a fish tank or a water tank in which fish or the like is housed alive. Here, the plate materials B1 to B5 are a transparent member including glass or resin such as acryl as a material.

It is noted that when the workpiece W is housed in a concave portion on the floor surface and when appreciation is of no importance, the plate materials B1 to B5 may be an opaque member, for example, a member including metal such as stainless and aluminum as a material. When a metal member is used as the plate materials B1 to B5 in this manner, the members may be welded instead of bonded.

The shape of the workpiece W is not limited to the shape illustrated in FIG. 5A and FIG. 5B, as long as it is a shape allowing the robot 10 to intrude inside and a shape obtained by bonding a plurality of members.

Figure 6:
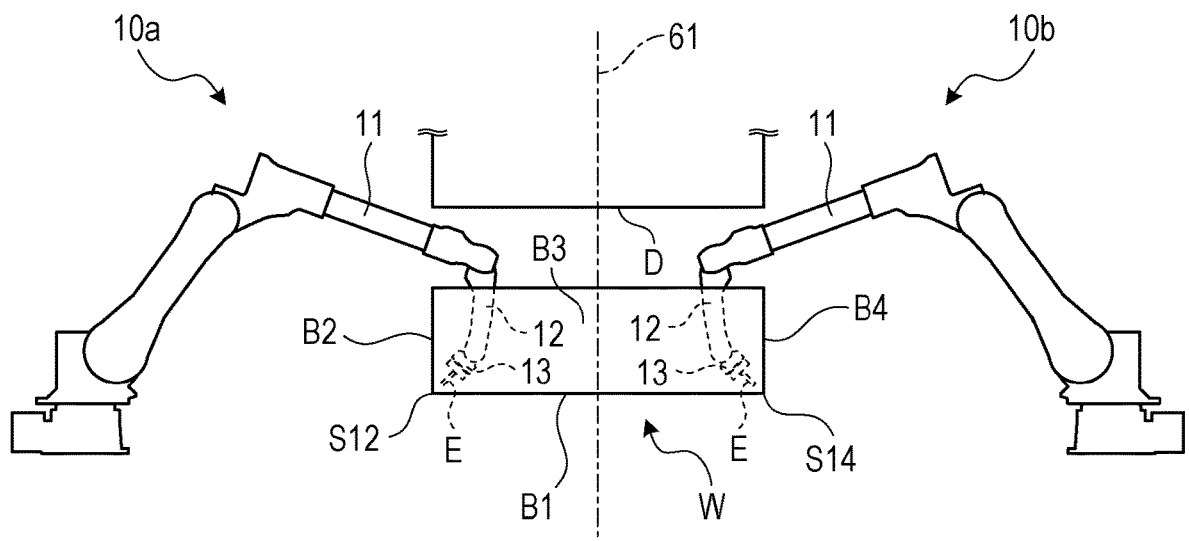
FIG. 6 illustrates an arrangement example of robots and a workpiece.

Next, the arrangement of the robots 10 and the workpiece W will be described with reference to FIG. 6. FIG. 6 illustrates an arrangement example of the robots 10 and the workpiece W. In FIG. 6, two robots 10 (a robot 10a and a robot 10b) are arranged symmetrically with respect to a symmetry plane 61. The symmetry plane 61 corresponds to a plane along which the workpiece W is symmetrically cut. An end effector E for discharging a sealing material is disposed to the tip of each of the robot 10a and the robot 10b.

Also, as illustrated in FIG. 6, an obstacle D is present above the workpiece W. The robots 10a and 10b invade into a space between the workpiece W and the obstacle D, and perform work for the inside of the workpiece W. As illustrated in FIG. 6, the robot 10a is in charge of sealing an area closer to the robot 10a from the symmetry plane 61. The robot 10b is in charge of sealing an area closer to the robot 10b from the symmetry plane 61.

For example, as illustrated in FIG. 6, the robot 10a seals the sealing portion S12 in a posture in which the second arm 12 is bent with respect to the first arm 11, and the wrist portion 13 is further bent with respect to the second arm 12.

It is noted that the robot 10a may perform sealing work on the side of the symmetry plane 61. In this case, the robot 10a has a posture in which, compared to the posture illustrated in FIG. 6, the second arm 12 is turned toward the side of the symmetry plane 61, and the wrist portion 13 is further turned toward the side of the symmetry plane 61. Accordingly, the robot 10a can take a posture in which the discharge port of the end effector E is directed toward the side of the symmetry plane 61.

Here, the robot 10a and the robot 10b have the relatively short second arm 12 as illustrated in FIG. 4 and the like. Therefore, even when the robot 10a and the robot 10b seal the sealing portions closer to themselves, the arm and the like hardly reaches across the symmetry plane 61. In brief, the robot 10a and the robot 10b are unlikely to interfere with each other. Accordingly, there is no need for complicated operation control such as an exclusion action control among the plurality of robots 10.

In the example illustrated in FIG. 6, two robots 10 are used. When there is a sufficient tact time to spare, one robot 10 may perform sealing work for the workpiece W. Also, in FIG. 6, the conveying mechanism of the workpiece W is omitted. As the conveying mechanism of the workpiece W, a conveyor belt for conveying the workpiece W or the like may be disposed.

Figure 7:
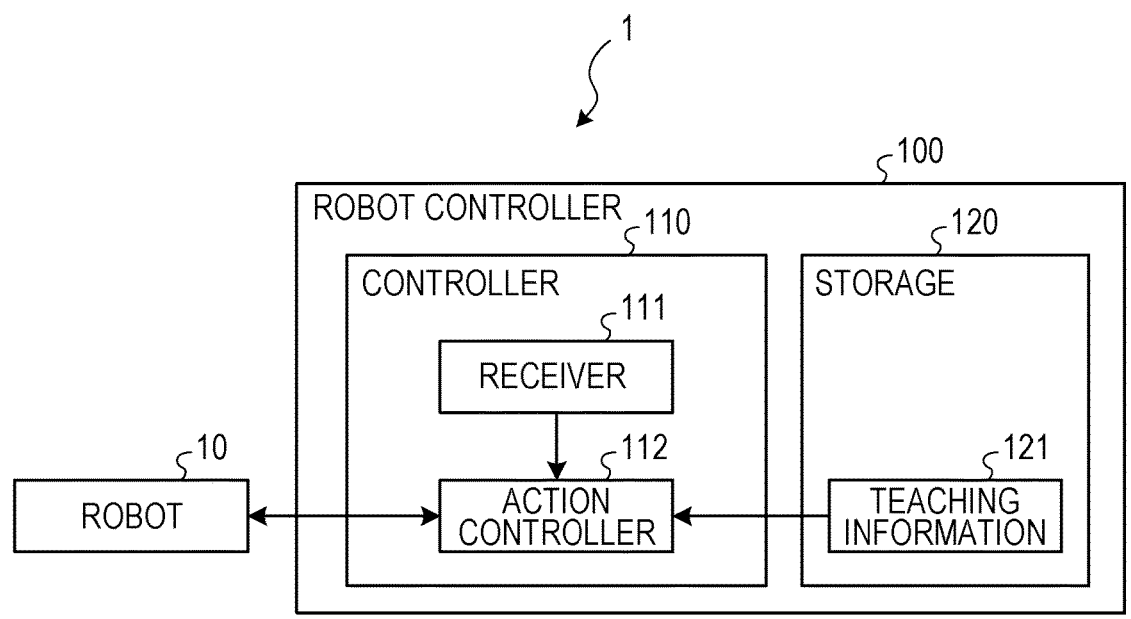
FIG. 7 is a block diagram illustrating a configuration of a robot system.

Next, a configuration of a robot system 1 according to an embodiment will be described with reference to FIG. 7. FIG. 7 is a block diagram illustrating the configuration of the robot system 1. As illustrated in FIG. 7, the robot system 1 includes a robot 10 and a robot controller 100. The robot 10 is connected to the robot controller 100. Also, a plurality of robots 10 may be connected to the robot controller 100.

The robot controller 100, for example, controls the robot 10. The robot controller 100 includes, for example, a controller 110 and a storage 120. The controller 110 includes a receiver 111 and an operation controller 112. The storage 120 stores teaching information 121. It is noted that in FIG. 7, one robot controller 100 is illustrated for facilitating the description. When a plurality of robots 10 is disposed, a plurality of robot controllers 100 each provided for each robot 10 may be used. In this case, a higher-level controller for bundling the robot controllers 100 may be disposed.

Here, the robot controller 100 contains, for example, a computer having a central processing unit (CPU), a read only memory (ROM), a random access memory (RAM), a hard disk drive (HDD), an input and output port, and the like, and various circuits.

A CPU of a computer, for example, reads and executes a program stored in a ROM to serve as the receiver 111 and the operation controller 112 of the controller 110.

Also, at least any one or all of the receiver 111 and the operation controller 112 can be constituted by hardware such as an application specific integrated circuit (ASIC) and a field programmable gate array (FPGA).

The storage 120 corresponds to a RAM or an HDD, for example. The RAM or the HDD can store the teaching information 121. It is noted that the robot controller 100 may be configured such that it acquires the above-described program and various pieces of information through another computer or a portable recording medium connected via a wired or wireless network. Furthermore, as described above, the plurality of robot controllers 100 may be configured as a group of devices capable of communicating with each other. Furthermore, the robot controller 100 may be configured as hierarchical devices capable of communicating with a higher-level or lower-level device.

The controller 110 performs operation control of the robot 10. It is noted that when the plurality of robot controllers 100 is used, the controllers 110 may also perform processing for synchronization among the robot controllers 100.

The receiver 111 receives information on the presence or absence, shape, and sealing portion of the workpiece W. The receiver 111 determines the operation timing and the operation contents of the robot 10 depending on the received information. The receiver 111 notifies the operation controller 112 of the determined operation timing and operation contents. For example, the receiver 111 acquires a timing when the workpiece W is disposed at a prescribed position. Furthermore, the receiver 111 transmits an instruction for actuating the robot 10 to the operation controller 112 based on the acquired timing.

The operation controller 112 actuates the robot 10 based on the instruction from the receiver 111 and the teaching information 121. The operation controller 112, for example, performs feedback control with an encoder value in an actuator such as a motor which is a power source of the robot 10, in order to improve the operation accuracy of the robot 10.

The teaching information 121 is produced in a teaching step of teaching an operation to the robot 10. The teaching information 121 is information containing a "job" that is a program for defining the operation route of the robot 10. It is noted that as illustrated in FIG. 6, when the robots 10 are arranged in the positions symmetrically with respect to the workpiece W, teaching data can be shared and reversely used. Therefore, according to the robot system 1, the time, labor, and cost for generating the teaching information 121 containing such teaching data can be suppressed.

As described above, the robot 10 according to an embodiment includes the first arm 11, the second arm 12, and the wrist portion 13. The first arm 11 rotates around the first axis A1. The base end side of the second arm 12 is supported by the tip side of the first arm 11. The second arm 12 turns around the second axis A2 which is orthogonal to the first axis A1. The base end side of the wrist portion 13 is supported by the tip side of the second arm 12. The wrist portion 13 turns around the third axis A3 which is parallel to the second axis A2. Furthermore, the tip side of the wrist portion 13 rotates around the fourth axis A4 which is orthogonal to the third axis A3.

Also, the first arm 11 includes the first base end portion 11a and the first stretch portion 11b. The first base end portion 11a includes the first through hole 11c running along the first axis A1. The first stretch portion 11b stretches along the first axis A1 toward the tip side from a position where the opening 11ca of the first through hole 11c is avoided in the first base end portion 11a.

The second arm 12 includes the second base end portion 12a and the second stretch portion 12b. The second base end portion 12a includes the second through hole 12c. When the posture of the robot 10 is such that the first axis A1 coincides with the fourth axis A4, the second through hole 12c runs along the first axis A1, and the second stretch portion 12b stretches along the first axis A1 toward the tip side from a position where the opening 12ca of the second through hole 12c is avoided in the second base end portion 12a.

Thus, according to the robot 10 according to an embodiment, spaces in which external apparatuses can be arranged can be secured on the first through hole 11c side of the first stretch portion 11b and on the second through hole 12c side of the second stretch portion 12b. Accordingly, when the robot 10 is actuated, external apparatuses can be inhibited from interfering with the workpiece W and the like. As a result, the movable range of the robot 10 can be widened.

In the above-described embodiment, a water tank and a fish tank have been illustrated as an example of the workpiece W. The workpiece W may be a body of a vehicle. In this case, the robot 10 may be configured such that it invades through a window or the like of a vehicle which is under manufacture and seals a bonding portion of a member from the inside of the vehicle.

Also, in the example illustrated in the above-described embodiment, the configuration for supporting the first arm 11 is a three-axis configuration containing the base portion 15 to rotate around the fifth axis A5, the lower arm 16 to turn around the sixth axis A6, and the upper arm 17 to turn around the seventh axis A7. However, the configuration is not limited to this, and the first arm 11 may be supported by another arm configuration such as a horizontal link with an elevating mechanism.

Also, in the example illustrated in the above-described embodiment, the first through hole 11c and the second through hole 12c pass through the insides of the members. Alternatively, part or an entirety of the portion along the stretch direction of the first through hole 11c and the second through hole 12c may be externally opened. That is, the first through hole 11c and the second through hole 12c may be configured such that part or an entirety thereof is externally opened.

Figure 8A:
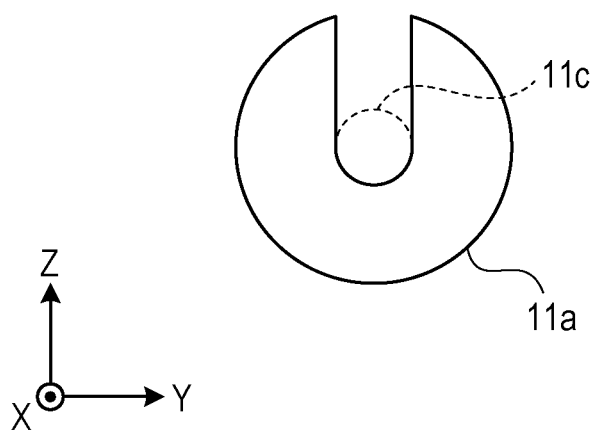
FIG. 8A is a schematic view illustrating a variation (No. 1) of a through hole.
Figure 8B:
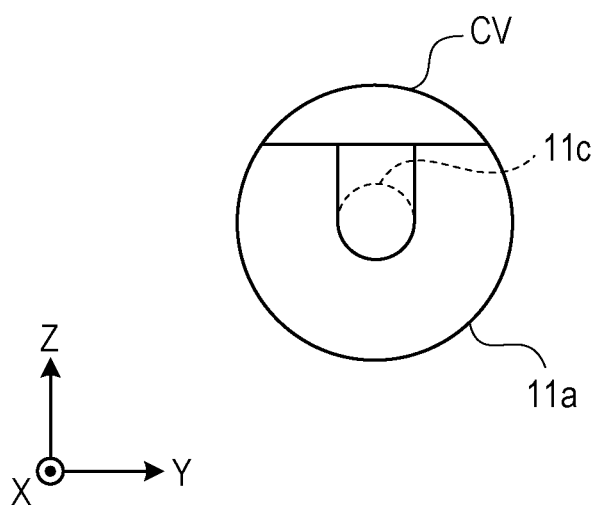
FIG. 8B is a schematic view illustrating a variation (No. 2) of a through hole.

This point will be described with reference to FIG. 8A and FIG. 8B. FIG. 8A is a schematic view illustrating a variation (No. 1) of a through hole. FIG. 8B is a schematic view illustrating a variation (No. 2) of a through hole. It is noted that although variations of the first through hole 11c are illustrated in FIG. 8A and FIG. 8B, the second through hole 12c can also be varied in a similar manner.

As illustrated in FIG. 8A, the first base end portion 11a may be shaped in such a manner that it is partly cut out, so that the first through hole 11c is externally opened. In the example illustrated in FIG. 8A, the upper side (the positive direction of the Z-axis) of the first base end portion 11a is cut out. Alternatively, the lateral side or lower side of the first base end portion 11a may be cut out.

Also, as illustrated in FIG. 8B, a detachable cover CV covering the cut out portion of the first base end portion 11a may be disposed to the first base end portion 11a. It is noted that a cover CV having a shape running along the outer periphery of the first base end portion 11a may be disposed while the shape of the first base end portion 11a is the shape illustrated in FIG. 8A.

In the examples illustrated in FIGS. 8A and 8B, access from the outside into the first through hole 11c or the second through hole 12c is enabled. This can improve maintenance property of the first through hole 11c or the second through hole 12c. The direction of the cutout of the first base end portion 11a and the direction of the cutout of the second base end portion 12a may be different from each other.

In the above-described embodiment, the robot 10 having seven axes has been illustrated as an example. The number of axes of the robot 10 may be 8 or more, or less than 6.

Further effects and variations can be easily derived by those skilled in the art. Therefore, a wider range of embodiments of the present disclosure is not limited to the specific detailed and representative embodiment as illustrated and described above. Thus, various modifications can be made without departing from the comprehensive conceptual spirit or range defined by the appended claims and their equivalents.

Embodiments of the present disclosure may be the following first to ninth robots. The first robot includes: a first arm which rotates around a first axis; a second arm whose base end side is supported by the tip side of the first arm and which turns around a second axis orthogonal to the first axis; and a wrist portion whose base end side is supported by the tip side of the second arm, which turns around a third axis parallel to the second axis, and whose tip side rotates around a fourth axis orthogonal to the third axis. In the first robot, the first arm has a first base end portion containing a first through hole running along the first axis and a first stretch portion stretching along the first axis toward the tip side from a position where an opening of the first through hole is avoided in the first base end portion, and the second arm has a second base end portion containing a second through hole running along the first axis in a posture in which the first axis and the fourth axis coincide with each other and a second stretch portion stretching along the first axis toward the tip side from a position where an opening of the second through hole is avoided in the second base end portion.

The second robot is the first robot in which the two first stretch portions are disposed in such a manner as to sandwich the opening of the first through hole in the first base end portion, and support the second base end portion of the second arm.

The third robot is the second robot in which one of the first stretch portions has in its inside a space for housing part of a cable routed from the first arm to the second arm.

The fourth robot is the third robot in which the other of the first stretch portions has in its inside a transfer portion which transfers power for turning the second arm around the second axis.

The fifth robot is any one of the first to fourth robots in which the two second stretch portions are disposed in such a manner as to sandwich the opening of the second through hole in the second base end portion, and support the base end portion of the wrist portion.

The sixth robot is any one of the first to fifth robots in which the second base end portion houses a power source provided for the third axis and a power source provided for the fourth axis in positions where the second through hole is avoided.

The seventh robot is any one of the first to sixth robots in which the central axis of the first through hole coincides with the first axis.

The eighth robot is any one of the first to seventh robots in which the central axis of the second through hole coincides with the first axis in a posture in which the first axis and the fourth axis coincide with each other.

The ninth robot is any one of the first to eighth robots further including: a base portion to rotate around a fifth axis which is perpendicular to an installation surface; a lower arm supported by the base portion to turn around a sixth axis which is perpendicular to the fifth axis; and an upper arm supported by the lower arm to turn around a seventh axis which is parallel to the sixth axis and support the first arm.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot comprising:
a first arm rotatable around a first axis, comprising:
  a first base including a first through hole passing through the first arm along the first axis; and
  a first extending portion extending from the first base along the first axis; and
a second arm having an extending direction and comprising:
  a second base including a connection portion connected to the first extending portion such that the second arm is rotatable around a second axis that is substantially orthogonal to the first axis, the second base including a second through hole passing through the second arm, the second through hole having a second through hole center axis that extends along the extending direction, the second through hole center axis being adjustable to coincide with the first axis; and
  a second extending portion provided opposite to the connection portion in the extending direction and extending from the second base along the extending direction, a wrist rotatably connected to the second extending portion, wherein the wrist comprises: a wrist base supported by the second extending portion such that the wrist is rotatable around a third axis that is substantially parallel to the second axis; a wrist tip connected to the wrist base such that the wrist tip is rotatable around a fourth axis that is substantially orthogonal to the third axis; a base rotatable around a fifth axis substantially orthogonal to an installation surface; a lower arm rotatably supported by the base around a sixth axis substantially orthogonal to the fifth axis; and an upper arm rotatably supported by the lower arm around a seventh axis substantially parallel to the sixth axis, the upper arm supporting the first arm.

2. The robot according to claim 1,
wherein the first extending portion is provided outside of the first through hole in a radial direction with respect to the first axis, and
wherein the second extending portion is provided outside of the second through hole in a direction that is substantially orthogonal to the extending direction.

3. The robot according to claim 1, wherein the second through hole passes through the second arm along the first axis when the first axis is substantially parallel to the fourth axis.

4. The robot according to claim 1,
wherein the first extending portion includes two first stretch portions,
   wherein the two first stretch portions are disposed in such a manner as to sandwich the first through hole when the first arm is viewed along the first axis, and
   wherein the two first stretch portions each support the second base of the second arm.

5. The robot according to claim 4, wherein
one of the two first stretch portions has an inner space for housing part of a cable routed from the first arm to the second arm.

6. The robot according to claim 5, wherein
the other of the two first stretch portions has a transfer portion which transfers, to the second arm, power to rotate the second arm around the second axis.

7. The robot according to claim 5, wherein
the second base of the second arm has a bifurcated shape.

8. The robot according to claim 1, wherein
the first base of the first arm houses a first power source provided for the second axis in a position outside of the first through hole.

9. The robot according to claim 1,
wherein the second extending portion includes two second stretch portions,
   wherein the two second stretch portions are disposed in such a manner as to sandwich the second through hole when the second arm is viewed along the extending direction, and
   wherein the two second stretch portions each support the wrist base of the wrist.

10. The robot according to claim 9, wherein
the wrist base of the wrist has a bifurcated shape.

11. The robot according to claim 1, wherein
the second base houses a second power source provided for the third axis and a third power source provided for the fourth axis in positions outside of the second through hole.

12. The robot according to claim 1, wherein
a central axis of the first through hole coincides with the first axis.

13. The robot according to claim 1, wherein
when the first axis and the fourth axis coincide with each other, a central axis of the second through hole coincides with the first axis.

14. The robot according to claim 1, wherein
a first distance between the second axis and the third axis is shorter than a second distance between the seventh axis and the second axis.

15. The robot according to claim 14, wherein
a ratio between the second distance and the first distance between the second axis and the third axis is within a range of 2:1 to 4:1.

16. The robot according to claim 1,
wherein the first through hole is not exposed to an outside of the first arm in a radial direction with respect to the first axis, and
wherein the second through hole is not exposed to an outside of the second arm in a direction substantially orthogonal to the extending direction.

17. A robot system comprising:
the robot according to claim 1; and
a robot control circuit configured to control the robot.

* * * * *